US006458874B1

(12) United States Patent
Newton

(10) Patent No.: US 6,458,874 B1
(45) Date of Patent: Oct. 1, 2002

(54) COATING COMPOSITIONS HAVING IMPROVED DIRECT TO METAL ADHESION

(75) Inventor: David L. Newton, Toledo, OH (US)

(73) Assignee: BASF Corporation, Southfield, MI (US)

( * ) Notice: Subject to any disclaimer, the term of this patent is extended or adjusted under 35 U.S.C. 154(b) by 97 days.

(21) Appl. No.: 09/599,693

(22) Filed: Jun. 22, 2000

(51) Int. Cl.$^7$ .............................. C08K 5/52; C08K 3/32
(52) U.S. Cl. ....................... 524/140; 524/141; 524/416; 524/417; 252/383; 252/389.23
(58) Field of Search ............... 252/383, 389.23; 524/140, 141, 416, 417

(56) References Cited

U.S. PATENT DOCUMENTS

| | | | | |
|---|---|---|---|---|
| 3,630,790 A | * | 12/1971 | Schmidt et al. ............... | 106/14 |
| 4,026,815 A | * | 5/1977 | Lkallfass et al. ............ | 252/180 |
| 4,450,257 A | | 5/1984 | Behmel et al. .............. | 525/437 |
| 5,191,029 A | | 3/1993 | Deldonno ................... | 525/366 |
| 5,252,363 A | * | 10/1993 | Anderson ................... | 427/386 |
| 5,322,870 A | * | 6/1994 | Lin ........................... | 524/132 |
| 5,859,154 A | | 1/1999 | Temple et al. .............. | 525/509 |

FOREIGN PATENT DOCUMENTS

| | | | | |
|---|---|---|---|---|
| EP | 0 101 838 A1 | 7/1983 | ............ | C08G/63/68 |
| EP | 0 376 591 A1 | 12/1989 | ............ | C08F/30/02 |

OTHER PUBLICATIONS

Patent Abstract of Japan, Mitsubishi Rayon Co. Ltd, Nimoto Masaki, Publication No. JP 61143411, dated Jan. 7, 1986, Entitled "Acrylic Covering Material", 1 page.

* cited by examiner

*Primary Examiner*—Kriellion Sanders
(74) *Attorney, Agent, or Firm*—Mary E. Golote

(57) ABSTRACT

The invention relates to a composition comprising a combination of compounds providing improved "direct to metal" adhesion and coating compositions comprising said composition. The coating compositions of the invention have improved adhesion when applied directly over metal substrates, especially untreated metal substrates such as galvanized steel, unsanded aluminum and unsanded cold-rolled steel. More particularly, the invention provides a composition comprising (I) an effective amount of a first compound having an acid number of from 70 to 120 mg KOH/g, a hydroxyl number of from 200 to 400 mg KOH/g, a number average molecular weight of from 300 to 700, and which is the reaction product of (a) at least one difunctional carboxylic acid, (b) at least one trifunctional polyol, (c) at least one chain stopper, and (d) phosphoric acid, and (II) an effective amount of a second compound comprising a carboxy phosphate ester having the formula:

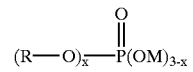

wherein R is an $C_5$–$C_{40}$ aliphatic group in which one or more aliphatic carbon atoms are substituted with lateral or terminal —COOR$^1$ groups, wherein R$^1$ is H, metal, ammonium, $C_1$–$C_6$ alkyl, or $C_6$–$C_{10}$ aryl, M is hydrogen, metal or ammonium and x is a number from 0 to 3.

15 Claims, No Drawings

COATING COMPOSITIONS HAVING IMPROVED DIRECT TO METAL ADHESION

FIELD OF THE INVENTION

The invention relates to coating compositions useful in automotive refinish operations and having improved adhesion to metal substrates. More particularly, the coating compositions of the invention are intended for direct use over large areas of untreated metal substrates such as galvanized steel, aluminum and cold-rolled steel.

BACKGROUND OF THE INVENTION

As used herein, "automotive refinish" refers to compositions and processes used in the repair of a damaged automotive finish, usually an OEM provided finish. Refinish operations may involve the repair of one or more outer coating layers, the repair or replacement of entire automotive body components, or a combination of both. The terms "refinish coating" or "repair coating" may be used interchangeably.

Automotive refinishers must be prepared to paint a wide variety of materials. Examples of commonly encountered materials are one or more previously applied coatings, plastic substrates such as RIM, SMC and the like, and metal substrates such as aluminum, galvanized steel, and cold rolled steel. Bare metal and plastic substrates are often exposed as a result of the removal of the previously applied coating layers containing and/or surrounding the defect area. However, it is often difficult to obtain adequate adhesion of refinish coatings applied directly to exposed bare substrates.

Among the many factors influencing the degree of refinish coating/substrate adhesion are the type of exposed substrate, the presence or absence of adhesion promoting pretreatments and/or primers, the size of the exposed area to be repaired, and whether previously applied "anchoring" coating layers surround the exposed repair area.

For example, refinish adhesion is particularly challenging when the exposed substrate is a bare metal such as galvanized iron or steel, aluminum or cold rolled steel. It is especially hard to obtain adequate refinish adhesion to galvanized iron. "Galvanized iron or steel" as used herein refers to iron or steel coated with zinc. "Steel" as used herein refers to alloys of iron with carbon or metals such as manganese, nickel, copper, chromium, molybdenum, vanadium, tungsten and cobalt.

Refinish operations have traditionally used adhesion pretreatments to overcome the adhesion problems associated with the coating of bare metal substrates. Pretreatment as used herein may refer to either mechanical or chemical alterations of the bare metal substrate. Mechanical alterations used to obtain improved adhesion include sanding, scuffing, and the like. Chemical alterations include treatment of the substrate with compositions such as chromic acid conversion coatings, acid etch primers and the like.

Although such pretreatments have obtained improved refinish adhesion, they are undesirable for a number of reasons. Most importantly, pretreatments are inefficient and expensive to apply in terms of material, time, and/or labor costs. Some chemical pretreatments also present industrial hygiene and disposal issues. Finally, the use of some pretreatments such as acid etch primers may contribute to water sensitivity and/or coating failure under test conditions of extreme humidity.

Accordingly, it is highly desirable to eliminate the need for substrate pretreatment as regards the refinish coating of bare metal substrates.

In addition, adhesion to bare metal substrates is improved when the defect area to be repaired is relatively small and is surrounded by previously applied coating layers. Such previously applied coating layers act as an 'adhesion anchor' to the refinish coating. However, many refinish repairs are of a size such that they lack any surrounding adhesion anchors. Moreover, such anchoring adhesion may be completely absent when replacement body parts are painted with a refinish coating.

Accordingly, it would be desirable to obtain refinish adhesion to bare exposed metal lacking any such 'adhesion anchors'.

Finally, improvements in refinish adhesion to bare exposed metal substrates must not be obtained at the expense of traditional refinish coating properties. Such properties include sandability, durability, ambient or low temperature cure, application parameters such as pot life, sprayability, and clean up, and appearance. Illustrative refinish coatings having such properties include urethane coatings, especially two component urethane coating.

Accordingly, it would be desirable to obtain urethane based refinish coatings having improved adhesion to bare metal substrates lacking any pretreatment or adhesion anchors.

SUMMARY OF THE INVENTION

These and other objects of the invention are achieved with the use of the compositions of the invention. It has unexpectedly been found that the combination of two particular materials provides improvements in adhesion which are better than the adhesion improvement obtained with either material alone. In particular, the invention broadly provides a composition comprising (I) an effective amount of a first compound having an acid number of from 70 to 120 mg KOH/g, a hydroxyl number of from 200 to 400 mg KOH/g, a number average molecular weight of from 300 to 700 and which is the reaction product of (a) at least one difunctional carboxylic acid, (b) at least one trifunctional polyol, (c) at least one chain stopper, and (d) phosphoric acid, and (II) an effective amount of a second compound comprising one or more carboxy phosphate esters of the formula:

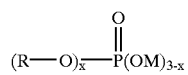

wherein R is an $C_5$–$C_{40}$ aliphatic group in which one or more aliphatic carbon atoms are substituted with lateral or terminal —COOR$^1$ groups, wherein R$^1$ is H, metal, ammonium, $C_1$–$C_6$ alkyl, or $C_6$–$C_{10}$ aryl, M is hydrogen, metal or ammonium, and x is a number from 0 to 3.

DETAILED DESCRIPTION OF THE PREFERRED EMBODIMENT

The composition of the invention requires the use of a mixture of a first compound (I) and a second compound (II), wherein compound (I) and compound (II) cannot be the same. It has unexpectedly been found that the combination of compounds (I) and (II) provides an improvement in refinish adhesion, i.e., the adhesion of a refinish coating to a bare exposed metal substrate, which is better than that obtained with the use of either compound (I) or compound (II) alone.

Compound (I) is an low molecular weight polyester compound having both acid and hydroxyl functionality. It will generally have a number average molecular weight in the range of from 150 to 3000, preferably from 300 to 1000, and most preferably from 400 to 600. Compound (I) will generally have a polydispersity of from 1.00 to 2.00, with a polydispersity of 1.50 being most preferred.

Suitable compounds (I) will also have an acid number in the range of from 70 to 120 mg KOH/g, preferably from 70 to 100 mg KOH/g, and most preferably from 70 to 80 mg KOH/g.

In addition, suitable compounds (I) will have a hydroxyl number in the range of from 200 to 400 mg KOH/g, more preferably from 300 to 400 mg KOH/g and most preferably from 330 to 360 mg KOH/g.

Compound (I) generally comprises the reaction product of the reaction of (a) at least one difunctional carboxylic acid, (b) at least one trifunctional polyol, (c) at least one chain stopper, and (d) phosphoric acid.

Examples of suitable difunctional carboxylic acids (a) include adipic acid, azeleic acid, fumaric acid, phthalic acid, sebacic acid, maleic acid, succinic acid, isophthalic acid, tetrahydrophthalic acid, hexahydrophthalic acid, dimer fatty acids, itaconic acid, glutaric acid, cyclohexanedicarboxylic acid, and mixtures thereof. Preferred difunctional carboxylic acids (a) are adipic acid and azeleic acid. Adipic acid is most preferred for use as difunctional carboxylic acid (a).

The at least one trifunctional polyol (b) may be branched or unbranched, but branched trifunctional polyols are preferred. Examples of suitable trifunctional polyols (b) are trimethylolpropane, trimethylol ethane, glycerin, 1,2,4-butanetriol, and mixtures thereof. Preferred trifunctional polyols (b) are trimethylolpropane and trimethylol ethane, with trimethylolpropane being a most preferred trifunctional polyol (b).

The at least one chain stopper will generally be a carboxylic acid that is different from the at least one difunctional carboxylic acid (a). Monocarboxylic acids are preferred. Suitable carboxylic acids (c) will preferrably contain one or more aromatic structures and will preferably contain some branched alkyl groups. Examples of suitable carboxylic acids (c) include para-t-butyl benzoic acid, benzoic acid, salicylic acid, 2-ethylhexanoic acid, pelargonic acid, isononanoic acid, $C_{18}$ fatty acids, stearic acid, lauric acid, palmitic acid, and mixtures thereof. Preferred carboxylic acids (c) include para-t-butyl benzoic acid, benzoic acid, and 2-ethylhexanoic acid, with para-t-butyl benzoic acid being most preferred.

Phosphoric acid (d) should be added to the reaction mixture in an amount of from 0.03 to 0.20, preferably from 0.05 to 0.15, and most preferably from 0.07 to 0.10. It will be appreciated that while phosphoric acid is most preferred, phosphate esters such as butyl or phenyl acid phosphate and the like are suitable for use as component (d) in the preparation of compound (I).

Polymerization of the reactants may occur at typical esterification conditions, ie., 200–230° C. reaction temperature while continuously removing water as a reaction by-product. Solvents that facilitate the removal of water from the reaction system (those that form an azeotrope) such as xylenes, may be used.

Reactants (a), (b), (c) and (d) will generally be used in a molar ratio of 4.2:4.9: 0.01:0.0005 to 5.1:5.6:0.7:0.005, preferably from 4.4:5.0:0.02:0.0008 to 5.0:5.5:0.6:0.003, and most preferably from 4.8:5.2:0.02:0.0009 to 4.9:5.4:0.06:0.002.

A commercially available and most preferred example of compound (I) is Borchigen HMP, commercially available from the Wolff Walsrode division of the Bayer Corporation of Burr Ridge, Ill., U.S.A.

Compound (II) comprises a carboxy phosphate ester having the formula:

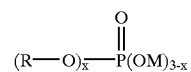

wherein M is hydrogen, metal or ammonium, x is a number from 0 to 3, and R is a saturated or unsaturated $C_5$–$C40$ aliphatic group in which one or more of the aliphatic carbon atoms can be substituted or replaced with a halogen atom (such as fluorine or chlorine), a $C_1$–$C_6$ alkyl group, a $C_1$–$C_6$ alkoxy group, a $C_6$–$C_{10}$ aromatic hydrocarbon group, preferably phenyl or naphthyl, or a a $C_6$–$C_{10}$ aromatic hydrocarbon group that is substituted with one or more (preferably 1 to 3) $C_1$–$C_6$ alkyl groups or —$COOR^1$ groups wherein $R^1$ is H, metal, ammonium, $C_1$–$C_6$ alkyl, or $C_6$–$C_{10}$ aryl, or mixtures thereof.

In preferred compounds (II), R will contain one or more $C_6$–$C_{10}$ aromatic hydrocarbon groups, and most preferably, one or more $C_6$–$C_{10}$ aromatic hydrocarbon groups which contain one or more, preferably at least two, —$COOR^1$ groups wherein $R^1$ is H, metal, ammonium, $C_1$–$C_6$ alkyl, or $C_6$–$C_{10}$ aryl.

In a most preferred compound (II), R will contain at least one $C_6$–$C_{10}$ aromatic hydrocarbon group and at least two —$COOR^1$ groups wherein $R^1$ is H, metal, ammonium, $C_1$–$C_6$ alkyl, or $C_6$–$C_{10}$ aryl. $R^1$ will most preferably be a $C_1$–$C_6$ alkyl or a $C_6$–$C_{10}$ aryl group.

The —$COOR^1$ groups may be lateral or terminal. It will be appreciated that when $R_1$ is H, compound (II) will comprise one or more free carboxylic acid groups. Similarly, when $R^1$ is a metal or ammonium ion, compound (II) will have one or more carboxylic acid salt groups. Finally, when $R^1$ is a $C_1$–$C_6$ alkyl or a $C_6$–$C_{10}$ aryl, compound (II) will comprise one or more ester groups.

It will be appreciated that suitable compounds (II) can and most preferably will comprise mixtures of compounds having the formula:

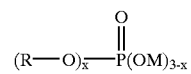

wherein R, M, x, and $R^1$ are as described above. However, in a most preferred embodiment, such a mixture will contain one or more molecules having the above structure wherein x is 1 or 2, preferably 1, R has at least one $C_6$–$C_{10}$ aromatic hydrocarbon group substituted with at least one, preferably two, —$COOR^1$ groups wherein $R^1$ is H or a $C_1$–$C_6$ alkyl or $C_6$–$C_{10}$ aryl, most preferably a $C_1$–$C_6$ alkyl, and M is H.

Compound (II) will generally have a number average molecular weight in the range of from 600 to 1200, preferably from 700 to 900, and most preferably from 750 to 850. Compound (II) will generally have a polydispersity of from 1.00 to 2.00, with a polydispersity of 1.00 to 1.50 being preferred and a polydispersity of 1.15; to 1.35 being most preferred.

Suitable compounds (II) will also have an acid number in the range of from 50 to 200 mg KOH/g, preferably from 100 to 180 mg KOH/g, and most preferably from 120 to 160 mg KOH/g. In addition, suitable compounds (II) will have a hydroxyl number in the range of from 100 to 250 mg KOH/g, preferably from 120 to 230 mg KOH/g, and most preferably from 150 to 200 mg KOH/g.

Suitable compounds (II) generally comprise the reaction product of (a) at least one difunctional polyol, (b) phosphoric. acid, and (c) at least one trifunctional carboxylic acid.

Examples of suitable difunctional polyols (a) include neopentanediol, ethylene glycol, diethylene glycol, propylene glycol, dipropylene glycol, hydrogenated bisphenol A, 1,6-hexanediol, hydroxypivalylhydroxypivalate, cyclohexanedimethanol, 1,4-butanediol, 2-ethyl-1,3-hexandiol, 2,2,4-trimethyl-1,3-pentandiol, 2-ethyl-2-butyl-1,3-propanediol, 2-methyl-1,3-propanediol, and mixtures thereof. Preferred difinctional polyols (a) are neopentane diol and 2-ethyl-2-butyl-1,3-propanediol, with neopentane diol being most preferred.

The at least one trifunctional carboxylic acid (c) may be aromatic or aliphatic in nature, but aromatic containing structures are most preferred. Examples of suitable trifunctional carboxylic acids are trimellitic acid, 1,3,5-benzenetricarboxylic acid, citric acid, and mixtures thereof. Preferred trifunctional carboxylic acids are 1,3,5-benzenetricarboxylic acid and trimellitic acid, with trimellitic acid being most preferred.

Phosphoric acid (c) is as described above with respect to (I(d)).

Polymerization of the reactants (a), (b), and (c) may occur at typical esterification conditions, ie., 200–230° C. reaction temperature while continuously removing water as a reaction by-product. Solvents that facilitate the removal of water from the reaction system (those that form an azeotrope) such as xylenes, may be used. The reaction can also be subsquently admixed with suitable solvents.

Reactants (a), (b), and (c) will generally be used in a ratio of 6.3:3.0:0.05 to 7.9:4.0:0.15, preferably from 6.7:3.2:0.07 to 7.6:3.8:0.12, and most preferably from 6.9:3.3:0.09 to 7.3:3.5:0.11.

A commercially available and most preferred example of compound (II) is LUBRIZOL™ 2063, available from the Lubrizol Corp of Wickliffe, Ohio.

Compound (I) will typically comprise from 50 to 80% by weight of the mixture of compound (I) and compound (II), preferably from 60 to 75% by weight, and most preferably from 65 to 70% by weight, based on the total weight of the mixture of compound (I) and compound (II). Compound (II) will comprise from 20 to 50% by weight of the mixture of compound (I) and compound (II), preferably from 25 to 40% by weight, and most preferably from 30 to 35% by weight, based on the total weight of the mixture of compound (I) and compound (II).

The composition comprising the mixture of compound (I) and compound (II) will typically be present in a coating composition in an amount of from 0.10 to 1.00% by weight, preferably from 0.10 to 0.30%, and most preferably from 0.15 to 0.25% by weight, based on the total nonvolatile weight of the coating composition.

The mixture of compound (I) and compound (II) may incorporated into finished coating compositions by conventional mixing techniques using mixing equipment such as a mechanical mixer, a cowles blade, and the like. Although the additives may be added during the manufacturing process or subsquently to a finished coating, those skilled in the art will appreciate that in a most preferred embodiment, the additives will be added post grind during the manufacturing process. Although the mixture of compound (I) and compound (II) may be used in single or two component systems, use in two-component systems is preferred, particularly where the mixture of compounds (I) and (II) is placed in the resin component of a two component system.

Finally, although a variety of packaging options are suitable for containing the coating compositions of the invention, it is most preferred that coating compositions containing the mixture of compounds (I) and (II) be packaged in epoxy or phenolic lined cans. Packaging in such containers has been found to ensure the retention of optimum adhesion characteristics.

The mixture of compound (I) and compound (II) when used in coating compositions provides improved adhesion of the coating composition to bare untreated metal substrates, including aluminum and galvanized steel substrates.

Coating compositions of the invention comprising the mixture of compound (I) and compound (II) may comprise any of the film-forming components used in the refinish coatings industry. Such coating compositions may rely on air dry lacquer film formation, film formation via chemical crosslinking, or a combination thereof. Thermosetting films produced by chemical crosslinking are most preferred.

Thermosetting coatings of the invention will comprise at least one film-forming polymer and at least one crosslinking agent. The film-forming polymer will comprise one or more functional groups reactive with one or more functional groups on the crosslinking agent. Examples of functional group combinations useful for the production of crosslinked coatings include, but are not limited to, active-hydrogen and isocyanate, epoxide and carboxylic acid, hydroxyl/carboxylic acid and/or urea-formaldehyde/melamine-formaldehyde, epoxide and amine, and the like.

Although the film-forming polymer may contain any functional group reactive with the fiunctional group present on the crosslinking agent, preferably the functional group present on the film-forming polymer is at least one functional group selected from the group consisting of hydroxyl, amine, carboxylic acid, epoxy and mixtures thereof. Especially preferred functional groups for use on the film-forming polymer are hydroxyl groups and amine groups, with hydroxyl groups being most preferred.

Examples of suitable film-forming polymers are acrylic polymers, polyurethane polymers, polyesters, alkyds, polyarnides, epoxy group containing polymers, and the like.

Particularly preferred film forming polymers will be difunctional, generally having an average functionality of about two to eight, preferably about two to four. These compounds generally have a number average molecular weight of from about 400 to about 10,000, preferably from 400 to about 8,000. However, it is also possible to use low molecular weight compounds having molecular weights below 400. The only requirement is that the compounds used as film-forming polymers not be volatile under the heating conditions, if any, used to cure the compositions.

More preferred compounds containing reactive hydrogen groups are the known polyester polyols, polyether polyols, polyhydroxyl polyacrylates, polycarbonates containing hydroxyl groups, and mixtures thereof In addition to these preferred polyhydroxyl compounds, it is also possible to use polyhydroxy polyacetals, polyhydroxy polyester amides, polythioether containing terminal hydroxyl groups or sulphydryl groups or at least difunctional compounds containing amino groups, thiol groups or carboxy groups. Mixtures of the compounds containing reactive hydrogen groups may also be used.

In a most preferred embodiment of the invention, the film forming polymer reactable with the crosslinking agent is an acrylic resin, which may be a polymer or oligomer. The acrylic polymer or oligomer preferably has a number average molecular weight of 500 to 1,000,000, and more preferably of 1000 to 20,000. Acrylic polymers and oligomers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such resins include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylamino-ethylacrylate. Other acrylic monomers having active hydrogen functional groups in the ester portion of the monomer are also within the skill of the art.

Modified acrylics can also be used. Such acrylics may be polyester-modified acrylics or polyurethane-modified acrylics, as is well-known in the art. Polyester-modified acrylics modified with e-caprolactone are described in U.S. Pat. No. 4,546,046 of Etzell et al, the disclosure of which is incorporated herein by reference. Polyurethane-modified acrylics are also well-known in the art. They are described, for example, in U.S. Pat. No. 4,584,354, the disclosure of which is incorporated herein by reference.

Polyesters having active hydrogen groups such as hydroxyl groups can also be used as the film forming polymer in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Polyurethanes having active hydrogen functional groups are also well-known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

Although polymeric or oligomeric active hydrogen components are often preferred, lower molecular weight non-polymeric active hydrogen components may also be used in some applications, for example aliphatic polyols (e.g., 1,6-hexane diol), hydroxylamines (e.g., monobutanolamine), and the like.

Examples of suitable crosslinking agents include those compounds having one or more functional groups reactive with the functional groups of the film-forming polymer. Examples of suitable crosslinking agents include isocyanate functional compounds and aminoplast resins, epoxy functional compounds, acid functional compounds and the like. Most preferred crosslinkers for use in the coating compositions of the invention are isocyanate functional compounds.

Suitable isocyanate functional compounds include poly-isocyanates which are aliphatic, including cycloaliphatic polyisocyanates, or aromatic. Useful aliphatic polyisocyanates include aliphatic diisocyanates such as ethylene diisocyanate, 1,2-diusocyanatopropane, 1,3-diisocyanatopropane, 1,6-diisocyanatohexane, 1,4-butylene diisocyanate, lysine diisocyanate, hexamethylene diisocyanate (HDI), 1,4-methylene bis-(cyclohexylisocyanate) and isophorone diisocyanate. Useful aromatic diisocyanates include the various isomers of toluene diisocyanate, meta-xylenediioscyanate and para-xylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition, the various isomers of.alpha.,.alpha.,.alpha.',.alpha.'-tetramethyl xylene diisocyanate can be used.

In a most preferred embodiment, the crosslinking agent will comprise one or more components selected from the group consisting of hexamethylene diisocyanate (HDI), the isocyanurates of HDI, the biurets of HDI, and mixtures thereof, with the isocyanurates and biurets of HDI being particularly preferred.

Suitable isocyanate functional compounds may be unblocked, in which case the coating composition should be utilized as a two component system, i.e., the reactive components combined shortly before application, or they may be blocked. Any known blocking agents, such as alcohols or oximes, may be used.

In a most preferred emodiment of the coating compositions of the invention, the coating composition will be a two-component system with the reactive film forming polymer and the crosslinking agent combined shortly before application. In such an embodiment, the composition of the invention comprising the mixture of compounds (I) and (II) will be preferably incorporated with the film forming polymer containing component.

Component (II) may also comprise one or more solvents. In a preferred embodiment, component (II) will include one or more solvents. Suitable solvents and/or diluents include aromatics, napthas, acetates, ethers, esters, ketones, ether esters and mixtures thereof.

Additives, such as catalysts, pigments, dyes, leveling agents, and the like may be added as required to the coating compositions of the invention.

The coating compositions of the invention may be stored as such for prolonged periods at room temperature without gel formation or undesirable changes. They may be diluted as required to a suitable concentration and applied by conventional methods, for example, spraying or spread coating, and cured by exposure to ambient temperatures of from 70 to 75° F. for a period of from 1 to 3 hours, preferably from 1.5 to 2 hours.

However, sandable films of the coating compositions of the invention comprising mixtures of compounds (I) and (II) may also be obtained upon exposure of the applied coating to temperatures in the range of from at least 120° F., more preferably up to 140° F., for periods of from 30 to 50 minutes, preferably from 30 to 40 minutes.

The invention is further illustrated but is not limited by the following examples in which all parts and percentages are by weight unless otherwise specified.

EXAMPLE 1

A coating composition (A) according to the invention was prepared as follows by the adding the identified amounts of compounds (I) and (II) to a urethane primer. Two additional coating compositions showing the respective effects of compounds (I) and (II) alone, i.e., (B) and (C) were also prepared. The resultant mixtures of the urethane primer, and compound (I) and/or compound (II) were shaken for 30 minutes on a Red Devil® paint shaker. The hardener and reducer components were stirred by hand as were the ready to spray mixtures of the combined primers, hardeners, and reducers.

|  | Coating A | Coating B | Coating C |
|---|---|---|---|
| Urethane Primer[1] | 100.00 g | 100.00 | 100.00 |
| Compound (I)[2] | 1.00 g | 1.35 | 0.00 |
| Compound (II)[3] | 0.50 g | 0.00 | 1.95 |
| Hardener[4] | 17.56 g | 17.56 | 17.56 |

-continued

|  | Coating A | Coating B | Coating C |
|---|---|---|---|
| Reducer[5] | 11.96 g | 11.96 | 11.96 |
| Total | 131.02 g | 130.87 | 131.47 |

[1]A urethane primer based on a hydroxy functional acylic resin and an isocyanate containing crosslinker, comercially available as DP200 from BASF Corporation of Whitehouse, OH.
[2]Borchigen HMP, commercially available from Wolff Walstrode, Bayer Corporation of Burr Ridge, IL.
[3]LUBRIZOL ® 2063, commercially available from Lubrizol Corporation of Wickliffe, OH.
[4]An isocyanate based crosslinking component commercially available as PH20 Hardener from BASF Corp.
[5]A solvent containing reducer blend commercially available as VR20 Reducer from BASF Corp.

EXAMPLE 2

The coatings of Example 1 was applied to cold rolled steel panels (Q-Panel, R-412 (Steel, dull matte finish)), aluminum panels (Q-Panel, A-412 (aluminum, mill finish 3105 H24)), and galvanized steel (ACT labs, APR 18661(C) (ACT E60 E2G 60G 2 side)). The sanded steel and cold rolled steel panels were sanded with 240-grit sandpaper. Approximately 4 mil of the coatings of Example 1 were applied to each panel using conventional spray equipment and cured for two hours at ambient temperature, followed by sanding with 400 grit sand paper. Approximately 1.0 mils of commerically available R-M® Diamont® Red basecoat[6] were then applied using conventional spray equipment. The basecoat was allowed to flash for 20 minutes, followed with the application of 3.0 mils of a urethane based clearcoat[7] by high volume/low pressure (HVLP) spray application equipment. Panels were allowed to air dry for 6 days at ambient tempreature (65–70 degrees F.). Initial adhesion values are recorded in Table 1 below. After the six day drying period, the prepared panels were placed in a 100% Relative Humidity test @ 100° F. for 96 hous. Final adhesion results are recorded in Table 2. Initial and final adhesion was measured with the cross hatch adhesion test, i.e., a block of 25 squares cut throught the paint layers using a precut grid, each square=4% loss.

TABLE 1

Initial Adhesion Results % LOSS

|  | Urethane Primer[8] | Coating B | Coating C | Coating A |
|---|---|---|---|---|
| Cold Rolled Steel |  |  |  |  |
| Sanded | 6% | 0% | 0% | 0% |
| Un-sanded | 15% | 0% | 0% | 0% |
| Galvanized Alumimum | 5% | 0% | 0% | 0% |
| Sanded | 100% | 0% | 0% | 0% |
| Un-sanded | 100% | 0% | 0% | 14% |

[6]R-M and Diamont are registered trademarks of BASF. The red basecoat is commercially available from BASF Corpoartion of Whitehouse, OH as Diamont ® Basecoat. The basecoat was mixed with BASF's commerciaily available BCH2 hardener and UR-50 Reducer @ 4:1:1 by volume.
[7]BASF Corporation's commerically available 923-200 clearcoat mixed with BASF's commerically available 929-23 based hardener mixed at 2:1 by volume.
[8]The untreated urethane primer used in Example 1 for the preparation of the coating composition of the invention.

TABLE 2

Adhesion Results after 4 Days Humidity Exposure % LOSS

|  | Urethane Primer[9] | Coating B | Coating C | Coating A |
|---|---|---|---|---|
| Cold Rolled Steel |  |  |  |  |
| Sanded | 100% | 2% | 2% | 2% |
| Un-sanded | 100% | 2% | 2% | 2% |
| Galvanized Aluminum | 100% | 70% | 88% | 2% |
| Sanded | 100% | 1% | 1% | 1% |
| Un-sanded | 100% | 1% | 1% | 2% |

EXAMPLE 3

An experiment to determine the desireable ranges for compounds (I) and (II) was performed. Compounds (I) and (II) were added to the commercially available urethane primer composition used in Example 1 in the amounts set forth below in Table 3. Panels were prepared as indicated in Example 2 except that in this case, the primer coatings were allowed to dry for 2 hours at ambient temperature followed by immediate application of the basecoat. The primer was not sanded prior to application of the basecoat. The basecoat was flashed for 20 minutes at ambient followed by application of the clearcoat. Panels were air dryed for 11 days at ambient temperature before being placed in humidity testing for 72 hours. Final adhesion results are set forth below.

TABLE 3

|  | 1 | 2 | 3 | 4 | 5 | 6 |
|---|---|---|---|---|---|---|
| % of compound (I) based on N.V. of compound (I) on total coating composition solids | 1.04% | 1.35% | 0% | 0.83% | 1.24% | 1.04% |
| % of compound (II) based on N.V. of compound (II) on total coating composition solids. | 0.36% | 0% | 1.35% | 0.22% | 0.22% | 0.51% |
| Galvanized Adhesion Loss After 3 days Humidity | 25% | 40% | 75% | 18% | 65% | 100% |

[9]The untreated urethane primer used in Example 1 for the preparation of the coating composition of the invention.

What is claimed is:

1. A composition comprising
    (I) a first compound having an acid number of from 70 to 120mg KOH/g, a hydroxyl number of from 200 to 400mg KOH/g, a number average molecular weight of from 150 to 3000, and which is the reaction product of (a) at least one difunctional carboxylic acid, (b) at least one trifunctional polyol, (c) at least one chain stopper, and (d) phosphoric acid, and
    (II) a second compound comprising one or more carboxy phosphate esters having the formula:

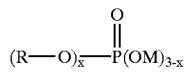

wherein M is hydrogen, metal, or ammonium, x is a number from 0 to 3, R is an $C_5$–$C_{40}$ aliphatic group having one or more —$COOR^1$ groups, wherein $R^1$ is H, metal, ammonium, $C_1$–$C_6$ alkyl, or $C_6$–$C_{10}$ aryl.

2. The composition of claim 1 wherein second compound (II) has an acid number of from 50 to 200 mg KOH/g, a hydroxyl number of from 100 to 250 mg KOH/g, a number average molecular weight of from 600 to 1200 and is the reaction product of (a) at least one difunctional polyol, (b) phosphoric acid, and (c) at least one trifunctional carboxylic acid.

3. The composition of claim 1 wherein compound (I) comprises the reaction product of components (a), (b), (c), and (d) reacted in a molar ratio of from 4.2:4.9:0.01:0.0005 to 5.1:5.6:0.7:0.005.

4. The composition of claim 1 wherein compound (I) comprises an acid number of from 70 to 100 mg KOH/g, a hydroxyl number of from 300 to 400 mg KOH/g, a number average molecular weight of from 400 to 600.

5. The composition of claim 1 comprising from 50 to 80% by weight of compound (I) and from 20 to 50% by weight of compound (II), based on the total weight of the mixture of compound (I) and compound (II).

6. The composition of claim 5 comprising from 60 to 75% by weight of compound (I) and from 25 to 40% by weight of compound (II), based on the total weight of the mixture of compound (I) and compound (II).

7. The composition of claim 1 wherein the at least one difunctional carboxylic acid (Ia) is selected from the group consisting of adipic acid, azeleic acid, fumaric acid, phthalic acid, sebacic acid, maleic acid, succinic acid, isophthalic acid, tetrahydrophthalic acid, hexahydrophthalic acid, dimer fatty acids, itaconic acid, glutaric acid, cyclohexanedicarboxylic acid, and mixtures thereof,
    the at least one trifunctional polyol (Ib) is selected from the group consisting of trimethylolpropane, trimethylol ethane, glycerin, 1,2,4-butanetriol, and mixtures thereof, and the at least one chain stopper (Ic) is selected from the group consisting of para-t-butyl benzoic acid, benzoic acid, salicylic acid, 2-ethylhexanoic acid, pelargonic acid, isononanoic acid, $C_{18}$ fatty acids, stearic acid, lauric acid, palmitic acid, and mixtures thereof.

8. The composition of claim 2 wherein
    the at least one difunctional polyol (IIa) is selected from the group consisting of neopentanediol, ethylene glycol, diethylene glycol, propylene glycol, dipropylene glycol, hydrogenated bisphenol A, 1,6-hexanediol, hydroxypivalylhydroxypivalate, cyclohexanedimethanol, 1,4-butanediol, 2-ethyl-1,3-hexandiol, 2,2,4-trimethyl-1,3-pentandiol, 2-ethyl-2-butyl-1,3-propanediol, 2-methyl-1,3-propanediol, and mixtures thereof, and
    the at least one trifunctional carboxylic acid (IIc) is selected from the group consisting of trimellitic acid, 1,3,5-benzenetricarboxylic acid, citric acid, , and mixtures thereof.

9. The composition of claim 7 wherein the at least one difunctional carboxylic acid (Ia) is adipic acid, the at least one trifunctional polyol (Ib) is trimethyolopropane and the at least one chain stopper (Ic) is para-t-butyl benzoic acid.

10. The composition of claim 8 wherein the at least one difinctional polyol (IIa) is neopentanediol and the at least one trifunctional carboxylic acid (IIc) is trimellitic acid.

11. A coating composition comprising
    a film forming component,
    (I) a first compound having an acid number of from 70 to 1.20 mg KOH/g, a hydroxyl number of from 200 to 400 mg KOH/g, a number average molecular weight of from 150 to 3000, and which is the reaction product of (a) at least one difunctional carboxylic acid, (b) at least one trifunctional polyol, (c) at least one chain stopper, and (d) phosphoric acid, and
    (II) a second compound comprising one or more carboxy phosphate esters having the formula:

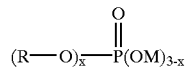

wherein M is hydrogen, metal, or ammonium, x is a number from 0 to 3, R is an $C_5$–$C_{40}$ aliphatic group having one or more —$COOR^1$ groups, wherein $R^1$ is H, metal, ammonium, $C_1$–$C_6$ alkyl, or $C_6$–$C_{10}$ aryl.

12. The coating compositions of claim 11 wherein the film forming component is comprised of an acrylic resin and an isocyanate functional crosslinking agent.

13. The coating composition of claim 11 which is a primer composition.

14. The coating composition of claim 11 comprising from 0.10 to 1.00% by weight of the mixture of compounds (I) and (II), based on the total nonvolatile weight of the coating composition.

15. A two component coating composition comprising
    a first component (I) comprising
        a resin comprising one or more active hydrogen groups,
        (I) a first compound having an acid number of from 70 to 120 mg KOH/g, a hydroxyl number of from 200 to 400 mg KOH/g, a number average molecular weight of from 150 to 3000, and which is the reaction product of (a) at least one difunctional carboxylic acid, (b) at least one trifunctional polyol, (c) at least one chain stopper, and (d) phosphoric acid, and
        (II) a second compound comprising one or more carboxy phosphate esters having the formula:

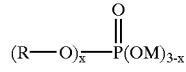

wherein M is hydrogen, metal, or ammonium, x is a number from 0 to 3, R is an $C_5$–$C_{40}$ aliphatic group having one or more —$COOR^1$ groups, wherein $R^1$ is H, metal, ammonium, $C_1$–$C_6$ alkyl, or $C_6$–$C_{10}$ aryl, and a second hardener component (II) comprising
        a crosslinking agent reactive with the resin comprising one or more active hydrogen groups.

* * * * *